Sept. 29, 1959    Z. NĚNIČKA ET AL    2,906,570
SUSPENSION BEARING ARRANGEMENT FOR TURBO
SETS IN HYDRAULIC POWER PLANTS
Filed Jan. 6, 1958    2 Sheets-Sheet 1

INVENTORS.
Zdeněk Něnička
BY Jaroslav Polák

Sept. 29, 1959     Z. NĚNIČKA ET AL     2,906,570
SUSPENSION BEARING ARRANGEMENT FOR TURBO
SETS IN HYDRAULIC POWER PLANTS
Filed Jan. 6, 1958     2 Sheets-Sheet 2

INVENTORS.
Zdeněk Něnička
BY Jaroslav Polák

United States Patent Office 2,906,570
Patented Sept. 29, 1959

2,906,570

SUSPENSION BEARING ARRANGEMENT FOR TURBO SETS IN HYDRAULIC POWER PLANTS

Zdeněk Němička, Brno, and Jaroslav Polák, Blansko, Czechoslovakia, assignors to Závody Jiřího Dimitrova, národní podnik, Blansko, Czechoslovakia Application January 6, 1958, Serial No. 707,241

Claims priority, application Czechoslovakia January 8, 1957

3 Claims. (Cl. 308—76)

The present invention relates to an improved suspension or thrust bearing arrangement for supporting the weight of the turbine wheel, shaft and generator in hydro-electric power plants. The known suspension structures of such bearings are either double-shell structures or are reinforced in a similar way. The pump and cooler for the lubricating oil together with the oil tank are placed outside the turbine pit in separate spaces or, in some cases, the cooler is placed on the outer shell of the generator stator. This arrangement has the disadvantages of being statically indeterminate, involving an intricate structure, and making access to, and inspection of the lubricating oil difficult.

The object of the present invention is to eliminate the above mentioned drawbacks by providing a single-shell suspension or thrust bearing structure which is much more simple and capable of being statically determined. Moreover, the pump and the cooler are mounted directly in the suspension structure of the bearing thereby shortening the pipe lines extending therefrom to the bearing. The accompanying drawings represent by way of example two embodiments of the suspension or thrust bearing arrangement according to the present invention.

Figure 1:
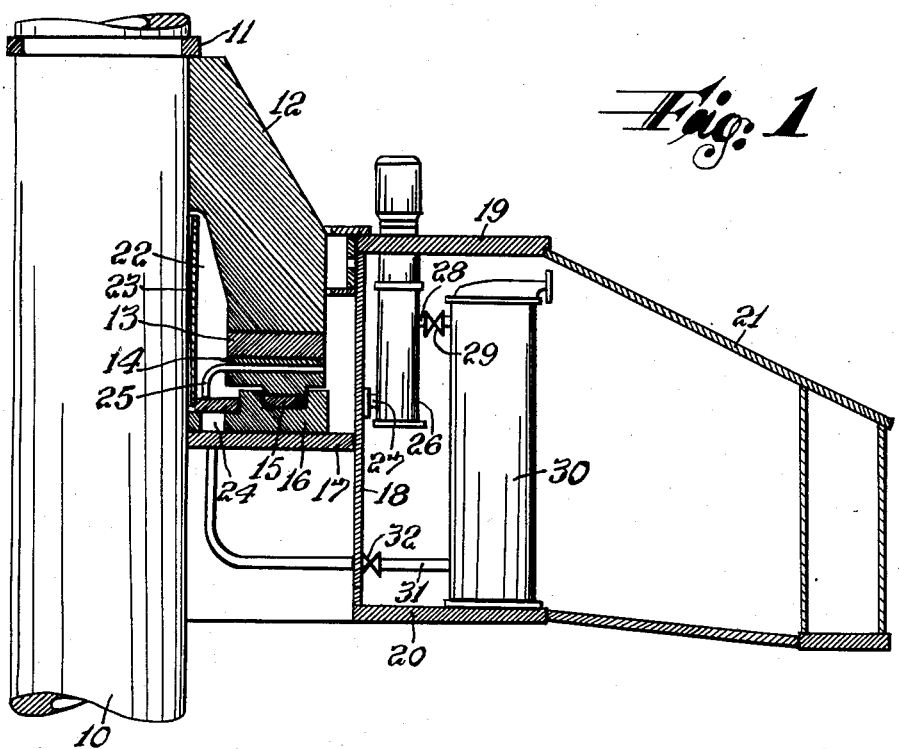
Figure 2:
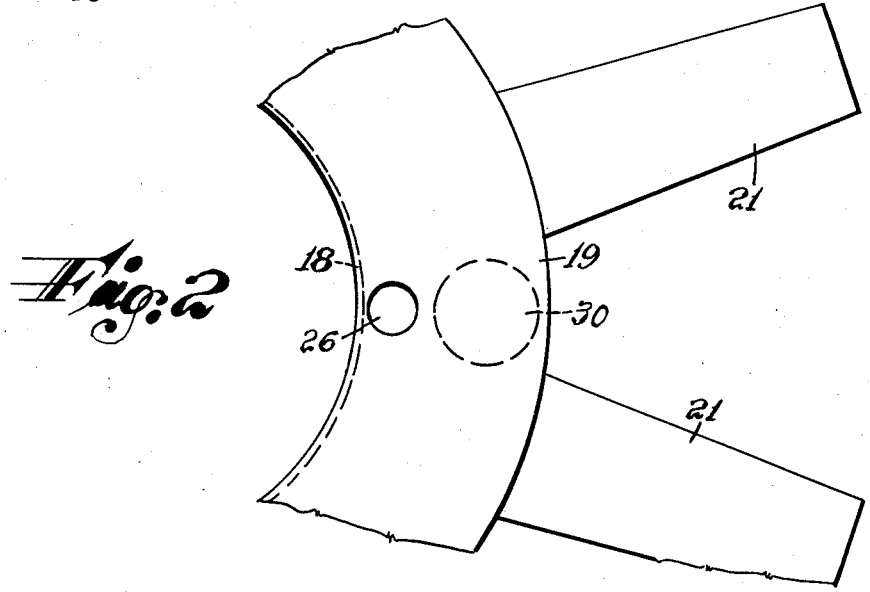
Figure 3:
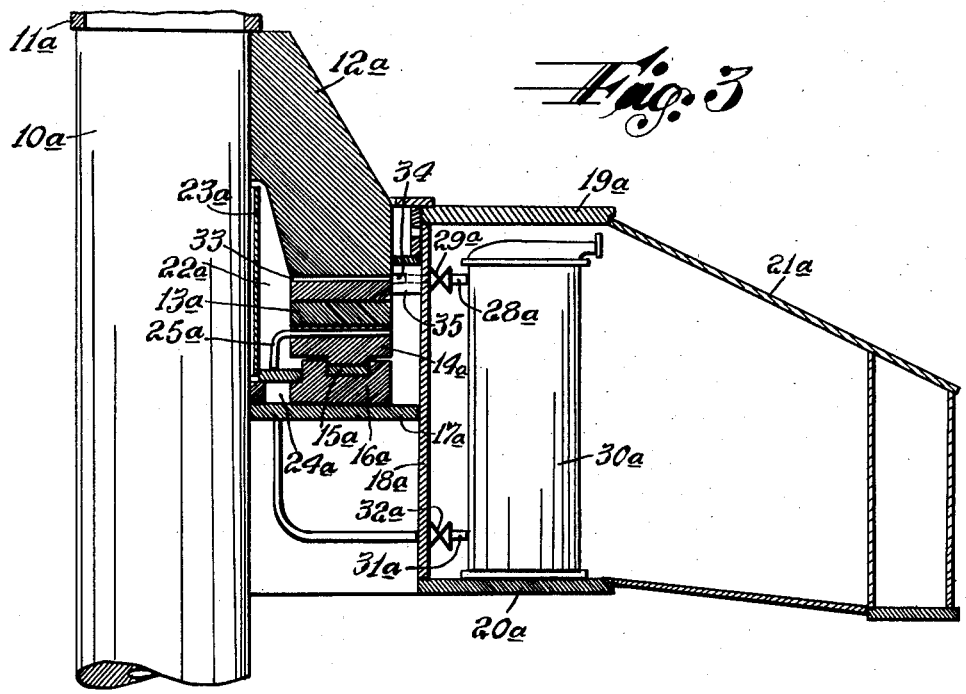
Figure 4:
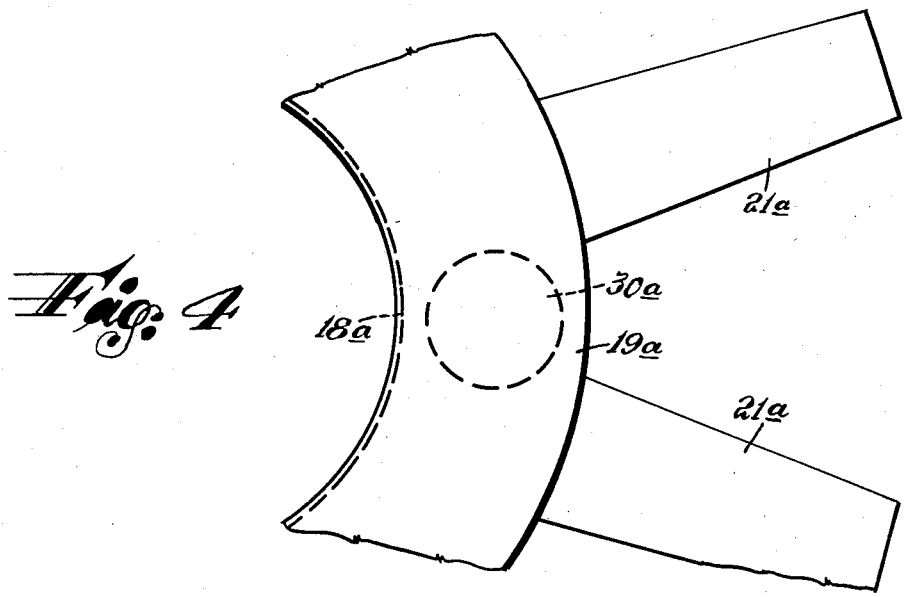

Figs. 1 and 2 being partial axial sectional and top plan views, respectively, of the first embodiment, and Figs. 3 and 4 being views similar to Figs. 1 and 2, but showing the second embodiment.

Referring to the drawings in detail, and initially to Figs. 1 and 2 thereof, it will be seen that the vertical shaft 10 which carries the usual water or turbine wheel and the rotor of the generator in a hydro-electric power plant has a collar 11 fixed axially thereon, for example, by engagement in a circumferential groove of the shaft, as shown, and resting upon a supporting head 12 which encircles the shaft and, at its lower end, carries the annular rotating element 13 of the thrust or suspension bearing. The rotating element 13 of the bearing slides on an oil film which is interposed between element 13 and fixed bearing segments 14. The fixed bearing segments 14 are supported by an elastic member 15 mounted in the annular bearing body 16.

The annular bearing body 16 rests on an annular, radially directed support plate 17 which extends inwardly from a cylindrical bearing shell 18. The structure for supporting the thrust or suspension bearing is completed by radially outwardly directed flanges 19 and 20 extending from the upper and lower edges, respectively, of the shell 18, and radially outwardly directed arm structures 21 which are suitably secured, as by welding, to the outer periphery of flanges 19 and 20.

The thrust bearing element 13 and fixed segments 14 are immersed in an oil bath 22 which is defined, at the bottom, by the support plate 17, at the outside, by the portion of the shell 18 above support plate 17, and at the inside, by an oil seal member 23 extending around the shaft 10.

A pressure chamber 24 is defined by a cavity within bearing body 16 and is supplied with lubricating oil under pressure in the manner hereinafter described in detail. Short ducts 25 extend upwardly and then radially outward from the pressure chamber 24 into the spaces between the adjacent fixed bearing segments 14, and jets of oil under pressure issue from the ducts 25 against the surfaces of the thrust bearing in slidable engagement with each other.

An oil pump 26 is suspended from the upper flange 19 immediately outside the shell 18, and the inlet to the pump 26 is connected to the oil bath 22 by way of a short pipe 27 connected to a suitable opening in shell 18. The outlet from the pump 26 is connected by a short pipe 28 having a valve 29 interposed therein to a cooler 30 which is supported on the lower flange 20, and the outlet of the cooler 30 is connected by a pipe 31 having a valve 32 interposed therein to the pressure chamber 24.

Thus, the pump 26 draws oil from the bath 22, which also functions as an oil reservoir, and pumps such oil through pipe 28, cooler 30 and pipe 31 to the pressure chamber 24 to issue from the latter through the short ducts 25.

If a sufficient pressure differential is built up in the oil bath surrounding the thrust or suspension bearing by reason of the difference in circumferential speed at the inner and outer peripheries of the rotating bearing element 13a and the head 12a, the pump 26 of the embodiment shown in Figs. 1 and 2 may be eliminated. Thus, as shown in Figs. 3 and 4, wherein the various parts of the structure are identified by the same reference numerals employed in connection with the description of the corresponding parts in Figs. 1 and 2, but with the letter "a" appended thereto, the rotating part of the thrust or suspension bearing, for example, the head 12a, is formed with a series of radially directed passages 33 extending therethrough and opening, at their radially outer ends, into an annular groove 34 formed in a fixed collecting member 35 which extends around the head 12a within the oil bath 22a. In the embodiment of Figs. 3 and 4, the inlet pipe 28a of the cooler 30a is connected directly to the groove 34 of the collecting member 35 and, in place of the pump 26 of the first described embodiment, the passages 33 of the head 12a act like a centrifugal pump in order to ensure the required circulation of the lubricating oil through the cooler 30a, the pipe 31a, the pressure chamber 24a, and the ducts 25a back to the oil bath 22a.

The fact that the pump and cooler, in Figs. 1 and 2, and the cooler in Figs. 3 and 4 are disposed outside the shell 18 or 18a in the immediate vicinity of the thrust bearing, but in a space separate from the oil bath 22 or 22a while still forming a compact unitary structure with the thrust bearing arrangement, affords the following important advantages:

The transfer of heat from the lubricating oil in the cooler 30 or 30a is very substantially increased, as compared with the existing arrangements having a cooling coil immersed in the oil bath;

There is no need to construct separate buildings or housings for sheltering the cooler and pump of the bearing lubricating sysem, thereby simplifying the production of the power plant and correspondingly reducing the cost of the latter;

The maintenance, operation and inspection of the lubricating system are substantially facilitated;

The lengths of the oil lines of the lubricating system are substantially shortened so that it becomes economically feasible to construct such oil lines of relatively costly non-corrosive material, thereby ensuring the purity of the lubricating oil without requiring an oil purification installation.

Although illustrative embodiments of the invention have been described in detail above with reference to the accompanying drawings, it is to be understood that the invention is not limited to those precise embodiments, and that various changes and modifications may be effected therein without departing from the scope or spirit of the invention, except as defined in the appended claims.

We claim:

1. A thrust bearing arrangement for the vertical shaft of a hydro-electric generator comprising a single cylindrical shell extending around said shaft and spaced radially from the latter, an annular, radially directed support plate extending around said shaft and secured at its outer periphery to said shell, upper and lower flanges extending radially outward from the upper and lower edges of said shell, radially outwardly directed arms extending from said flanges, fixed bearing means mounted on the upper surface of said support plate, a rotatable bearing element supported from said shaft and bearing downwardly on said fixed bearing means, said shell and said support plate defining walls of an oil bath around said shaft in which said fixed bearing means and rotatable bearing element are situated, and a lubricating system including an oil cooler mounted between said flanges immediately outside of said shell at a location intermediate two of said arms, means for feeding oil from said bath to said cooler and means for returning oil from said cooler to said oil bath.

2. A thrust bearing arrangement as in claim 1; wherein said means for feeding oil from the bath to the cooler includes an oil circulating pump also situated between said flanges immediately outside of said shell, and short conduits extending from said oil bath to the inlet of said pump and from the outlet of the latter to said cooler.

3. A thrust bearing arrangement as in claim 1; wherein said means for feeding oil from the bath to the cooler includes conduit means extending from said shell to said cooler and means in said oil bath rotating with said rotatable bearing element for centrifugally pumping oil from the oil bath into said conduit means.

References Cited in the file of this patent

UNITED STATES PATENTS

| | | |
|---|---|---|
| 1,362,754 | Sperry | Dec. 21, 1920 |
| 1,906,538 | Church | May 2, 1937 |
| 2,300,284 | Gayer | Oct 27, 1942 |

FOREIGN PATENTS

| | | |
|---|---|---|
| 273,320 | Italy | Apr. 5, 1930 |